(12) United States Patent
Xue et al.

(10) Patent No.: US 8,917,836 B2
(45) Date of Patent: Dec. 23, 2014

(54) METHOD AND EQUIPMENT FOR IMPLEMENTING INFORMATION EXCHANGE

(75) Inventors: Tao Xue, Shenzhen (CN); Fangmin Deng, Shenzhen (CN); Hongxing Guo, Shenzhen (CN); Haiqing Yan, Shenzhen (CN)

(73) Assignee: ZTE Corporation (CN)

( * ) Notice: Subject to any disclaimer, the term of this patent is extended or adjusted under 35 U.S.C. 154(b) by 288 days.

(21) Appl. No.: 13/127,783

(22) PCT Filed: Dec. 24, 2008

(86) PCT No.: PCT/CN2008/073709
§ 371 (c)(1),
(2), (4) Date: May 5, 2011

(87) PCT Pub. No.: WO2010/051672
PCT Pub. Date: May 14, 2010

(65) Prior Publication Data
US 2011/0216891 A1  Sep. 8, 2011

(30) Foreign Application Priority Data
Nov. 6, 2008  (CN) .......................... 2008 1 0172661

(51) Int. Cl.
*H04M 11/00* (2006.01)
*H04M 3/42* (2006.01)
*H04L 12/58* (2006.01)
*H04W 4/12* (2009.01)

(52) U.S. Cl.
CPC ...... *H04M 3/42042* (2013.01); *H04M 3/42382* (2013.01); *H04L 12/589* (2013.01); *H04L 51/36* (2013.01); *H04W 4/12* (2013.01)
USPC ................................... 379/90.01; 455/414.1

(58) Field of Classification Search
CPC .............. H04M 3/493; H04M 7/0024; H04M 3/42042; H04M 3/42093; H04M 3/42195; H04M 1/663
USPC .............. 379/90.01, 14, 112.09, 121.01, 227, 379/93.32, 142.05, 201.01, 204.01; 455/414.1
See application file for complete search history.

(56) References Cited

U.S. PATENT DOCUMENTS

| 5,046,189 A * | 9/1991 | Kainuma ................. 379/100.03 |
| 6,215,864 B1 * | 4/2001 | Goyal et al. ............. 379/221.11 |

(Continued)

FOREIGN PATENT DOCUMENTS

| CN | 101098498 A | 1/2008 |
| CN | 101415154 A | 4/2009 |
| JP | 2001045169 A | 2/2001 |

(Continued)

OTHER PUBLICATIONS

International Search Report for PCT/CN2008/073709, Completed by the Chinese Patent Office on Aug. 3, 2009, 4 Pages.

*Primary Examiner* — Akelaw Teshale
(74) *Attorney, Agent, or Firm* — Brooks Kushman P.C.

(57) ABSTRACT

A method for implementing information exchange is disclosed in the present invention, and the method comprises: a calling user terminal sending information to be sent to a called user terminal by carrying the information in a user-to-user signaling (UUS) field of a call message; the called user terminal sorting out the information carried in the UUS field from the call message after receiving the call message, and feeding back a message other than an acknowledge message to the calling user terminal; the calling user terminal terminating this call after receiving the message fed back by the called user terminal. The simplicity and the easy transformation of the software update of user terminals are fully utilized in the present invention; therefore the present invention can enable a user terminal to have the information exchange function only by properly modifying the software of the user terminal.

8 Claims, 4 Drawing Sheets

(56) References Cited

U.S. PATENT DOCUMENTS

| | | | |
|---|---|---|---|
| 7,324,645 B1 * | 1/2008 | Juopperi et al. | 380/247 |
| 7,751,541 B2 * | 7/2010 | Chambers et al. | 379/142.04 |
| RE42,601 E * | 8/2011 | Pernu et al. | 379/229 |
| 2004/0023676 A1 * | 2/2004 | Lee | 455/466 |
| 2008/0159500 A1 * | 7/2008 | Wang | 379/142.05 |

FOREIGN PATENT DOCUMENTS

| | | |
|---|---|---|
| WO | 0021267 A2 | 4/2000 |
| WO | 0021268 A2 | 4/2000 |

* cited by examiner

METHOD AND EQUIPMENT FOR IMPLEMENTING INFORMATION EXCHANGE

CROSS-REFERENCE TO RELATED APPLICATION

This application is the U.S. national phase of PCT Appln. No. PCT/CN2008/073709 filed Dec. 24, 2008 which claims priority to Chinese Patent No. 101415154 B, issued May 11, 2011, the disclosures of which are incorporated in their entirety by reference herein.

TECHNICAL FIELD

The present invention relates to the field of communication technology, and in particular, to a method and equipment for implementing information exchange.

BACKGROUND ART

Many communication modes and implementation forms, mainly including short message service, multimedia message service, E-mail service and so on, were brought up in the developing process of communication technology, but how to achieve more convenient communication modes is an important impetus for continuously developing communication technology.

User-to-user signaling (UUS) is a supplementary service, which allows a mobile user to receive/send some limited amount of information from/to an ISDN (Integrated Services Digital Network) or PLMN (Public Land Mobile-communication Network) user on a call-related signaling channel.

In the prior art, for example, a patent for a method for implementing end-to-end information exchange with an application No. of "02821658.X": by using a User-to-User Signaling (UUS) supplementary service that allows a served subscriber to send/receive some limited amount of information to/from another subscriber calling associated with the served subscriber, and to work in parallel with the normal communication channel, personalized items can be transmitted during call set-up or during call. Examples of the types of the personalized items are text messages, picture messages, animations or ringing tones.

However, transmission of personalized items described in the patent is a transmission process based on a call with a purpose of prompting the user to transmit the information associated with the call, its implementation must depend on the whole establishment process of the call, and display of the related information for the user still has to be done on the interface of the call.

SUMMARY OF THE INVENTION

The technical problem to be solved in the present invention is to provide a method and equipment for implementing information exchange to achieve information exchange between a calling user and a called user without conversation through a call.

In order to solve the above technical problem, the present invention provides a method for implementing information exchange, comprising:
   a calling user terminal sending information to be sent to a called user terminal by carrying the information in a user-to-user signaling (UUS) field of a call message;
   the called user terminal sorting out the information carried in the UUS field from the call message after receiving the call message, and feeding back a message other than an acknowledge message to the calling user terminal; and
   the calling user terminal terminating this call after receiving the message fed back by the called user terminal.

Furthermore, the calling user terminal sends the information to be sent to the called user terminal through one or more call messages; after sorting out the information carried in the UUS field, the called user terminal also judges whether the information is complete or not; the message other than an acknowledge message is a message containing a UUS field, and the called user terminal carries a judging result in the UUS field in the message that is fed back; if the judging result is "not complete", then after receiving the message fed back by the called user terminal, the calling user terminal continues to send a subsequent part of the information to be sent to the called user terminal through a UUS field of a call message that is sent subsequently.

Furthermore, the calling user terminal carries the information to be sent in a UUS field of a call message in the following way:
   editing the information to be sent on the calling user terminal;
   when initiating a call, the calling user terminal carrying the information in the UUS fields of one or more call messages according to a size of the edited information to be sent;
   the calling user terminal further recording in the UUS field of the call message carrying the information a total number of pieces of the information and a sequence number of the information carried in the UUS field.

Furthermore, the way for the called user terminal to judge whether the information is complete or not comprises:
   the called user terminal judging whether the information carried in the UUS field is a single piece of information or one of a plurality pieces of information according to the total number of pieces of information recorded in the UUS field;
   the judging result being "complete" if the information is a single piece of information;
   otherwise, comparing the sequence number with the total number;
   the judging result being "complete" if the sequence number is equal to the total number and there is no omission;
   the judging result being "not complete" and waiting for information with a sequence number that is omitted if the sequence number is equal to the total number but there is omission;
   the judging result being "not complete" and waiting for information with a next sequence number if the sequence number is less than the total number.

Furthermore, said continuing to send a subsequent part of the information to be sent to the called user terminal through a UUS field of a call message that is sent subsequently comprises:
   if the judging result is "not complete" and information with a next sequence number is waited for, the calling user terminal carrying the information with a next sequence number in a UUS field of a call message in a next call;
   if the judging result is "not complete" and information with an omitted sequence number is waited for, sending the information with an omitted sequence number in a UUS field of a call message of a next call.

An equipment for implementing information exchange, comprising: an inserting module, a detecting module, a judging module and a processing module, wherein;

the inserting module is used to insert information to be sent into a user-to-user signaling (UUS) field of a call message that is sent to a called user terminal;

the detecting module is used to detect a type of the UUS field of the call message that is received, and then instruct the judging module to work if the type is sending information type;

the judging module is used to sort out the information carried in the UUS field of the call message that is received, and instruct the processing module to work;

the processing module comprises a called terminal processing sub-module and a calling terminal processing sub-module;

the called terminal processing sub-module is used to feed back a message other than an acknowledge message to the calling user terminal;

the calling terminal processing sub-module is used to terminate this call after receiving the message fed back by the called user terminal.

Furthermore, the inserting module inserts the information to be sent into one or more call messages; after sorting out the information carried in the UUS field, the judging module also judges whether the information is complete or not and sends a judging result to the processing module; the called terminal processing sub-module carries the judging result in the UUS field in the message that is fed back; the calling terminal processing sub-module is used to, when the judging result is "not complete", instruct the inserting module to continue to insert a subsequent part of the information to be sent into a UUS field of a call message that is sent subsequently and send the message to the called user terminal.

Furthermore, the inserting module carries the information to be sent in a UUS field of a call message in the following way:

the inserting module edits the information to be sent;

when initiating a call, the inserting module carries the information in the UUS fields of one or more call messages according to a size of the edited information to be sent;

the inserting module further records in the UUS field of the call message carrying the information a total number of pieces of information and a sequence number of the information carried in the UUS field.

Furthermore, the way for the judging module to judge whether the information is complete or not specifically comprises:

the judging module judging whether the information carried in the UUS field is a single piece of information or one of a plurality pieces of information according to the total number of pieces of information recorded in the UUS field;

the judging result being "complete" if the information is a single piece of information;

otherwise, comparing the sequence number with the total number;

the judging result being "complete" if the sequence number is equal to the total number and there is no omission;

the judging result being "not complete" if the sequence number is equal to the total number but there is omission, and waiting for information with a sequence number that is omitted;

the judging result being "not complete" if the sequence number is less than the total number, and waiting for information with a next sequence number.

Furthermore, the calling terminal processing sub-module instructing the inserting module to continue to insert a subsequent part of the information to be sent into a UUS field of a call message that is sent subsequently and sending the message to the called user terminal comprises:

if the judging result is "not complete" and information with a next sequence number is waited for, the calling terminal processing sub-module carrying the information with a next sequence number in a UUS field of a call message in a next call;

if the judging result is "not complete" and information with an omitted sequence number is waited for, the calling terminal processing sub-module instructing the inserting module to send the information with an omitted sequence number in a UUS field of a call message of a next call.

The simplicity and the easy transformation of the software update of user terminals are fully utilized in the present invention; therefore the technical solution disclosed in the present invention can enable a user terminal to have the information exchange function only by properly modifying the software of the user terminal. Wherein, the equipment for implementing information exchange can be applied to various types of telephone terminals, and both fixed telephone terminals and mobile telephone terminals can implement information exchange function conveniently. The telecommunication operators do not need to transform or update the switching equipment of the existing telephone network, and the information exchange between a calling user and a called user in a no-call situation can be achieved only by properly modifying (adding a software module of the corresponding service) the software of the user terminal.

PREFERRED EMBODIMENTS OF THE INVENTION

Figure 1A:
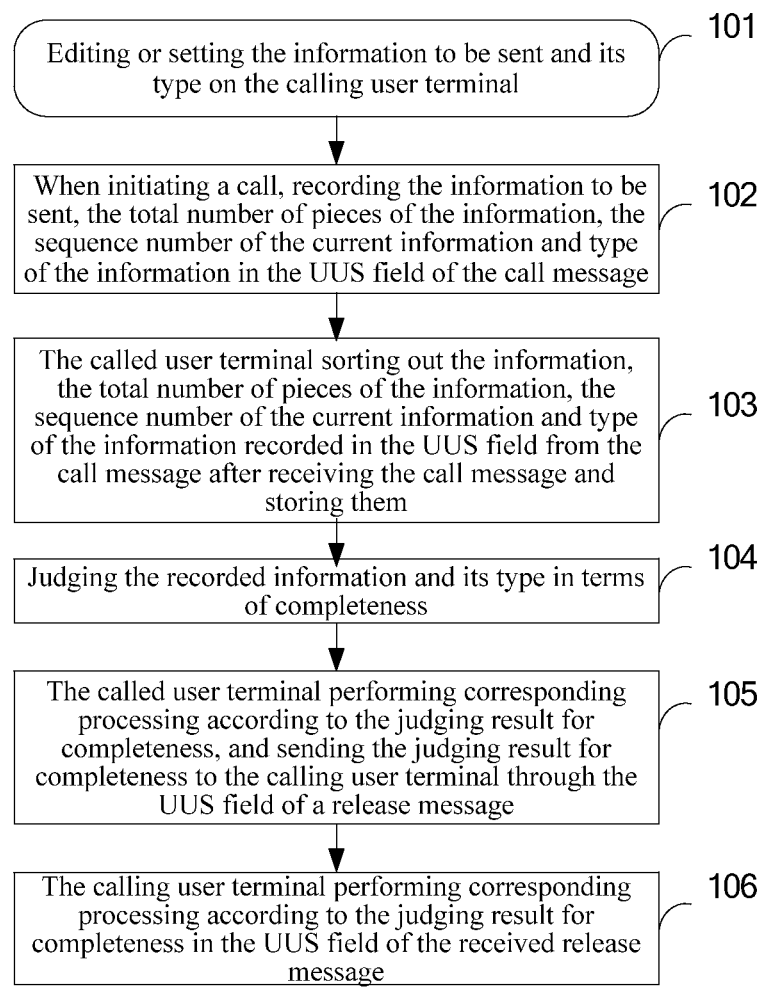
FIG. 1A is a logical flow chart of the method for implementing information exchange according to the application example of the present invention.

The technical scheme of the present invention will be further described below in detail with reference to the drawings and examples.

The UUS supplementary service is used for implementing pure information exchange in the present invention, wherein the calling user terminal sends the information to be sent to the called user terminal by carrying the information in a UUS field of a call message, the called user terminal does not feedback an acknowledge message of the call message to the calling user terminal after receiving the call message, thereby achieving information exchange transmission between the calling user terminal and the called user terminal without any actual conversation, thus making the process of information exchange independent from the process of conversation.

The present invention provides a method for implementing information exchange, comprising the following steps of:
a calling user terminal sending information to be sent to a called user terminal by carrying the information in a user-to-user signaling (UUS) field of a call message;
the called user terminal sorting out the information carried in the UUS field from the call message after receiving the call message, and judging whether the information is complete or not; feeding back a message containing a UUS field other than an acknowledge message to the calling user terminal, wherein the judging result is carried in the UUS field of the message that is fed back;
the calling user terminal terminating this call after receiving the message fed back by the called user terminal; if the judging result carried in the UUS field of the message is "not complete", then the calling user terminal carrying the corresponding information in the UUS field of a call message of the next call.

Optionally, the message containing a UUS field other than an acknowledge message may be, but not limited to, a release message, or a message other than an acknowledge message that is indicated in other protocols to contain a UUS field, for example, a ringing message.

Optionally, the step of a calling user terminal sending information to be sent to a called user terminal by carrying the information in a UUS field of a call message may specifically comprises:
editing or setting the information to be sent and its type on the calling user terminal;
when initiating a call, the calling user terminal carrying the information in a UUS field of one call message according to the size of the information, or splitting the message into a plurality pieces of information and carrying them in the UUS fields of a plurality of call messages respectively;
the calling user terminal recording in a UUS field of a call message carrying the information the type of the information, the total number of the pieces of information and the sequence number of the information carried in the UUS field.

For example, when the information is carried by the UUS fields of N call messages, the sequence number of the information carried in the UUS field of the first call message is 1, the sequence number of the information carried in the UUS field of the second call message is 2 . . . and so forth. If the information is only carried by the UUS field of one call message, then the sequence number is 1.

Correspondingly, the called user terminal also sorts out the type of the information, the total number of the pieces of information and the sequence number of the information carried in the UUS field after receiving the call message, and it can also store the above data that have been sorted out.

Optionally, the step of the called user terminal judging whether the information is complete or not specifically comprises:
the called user terminal judging whether the information carried in the UUS field is a single piece of information or one of a plurality pieces of information according to the total number of pieces of information recorded in the UUS field;
the judging result being "complete" if the information is a single piece of information; otherwise, comparing the sequence number with the total number;
the judging result being "complete" if the sequence number is equal to the total number and there is no omission;

the judging result being "not complete" if the sequence number is equal to the total number but there is omission, and waiting for information with a sequence number that is omitted;
the judging result being "not complete" if the sequence number is less than the total number, and waiting for information with a next sequence number.

When the judging result is that the information is complete, if the information carried in the UUS field is a single piece of information, the called user terminal may further prompt the called user whether to display the information; if the information carried in the UUS field is one of a plurality pieces of information, then the called user terminal may further combine all of the information of this type according to the type of the information recorded in the UUS field, store the combined information and prompt the called user whether to display the information.

When the judging result is "completely received", it is suggested that the information is successfully received.

Optionally, if the judging result carried in the UUS field of the message that is fed back by the called user terminal is "incompletely received", then the step of the calling user terminal carrying the corresponding information in the call message of the next call specifically comprises:
if the judging result carried in the UUS field of the message fed back by the called user terminal is "incompletely received" and information with the next sequence number is waited for, then the calling user terminal carrying the information with the next sequence number in the UUS field of the call message of the next call;
if the judging result carried in the UUS field of the message fed back by the called user terminal is "incompletely received" and information with the omitted sequence number is waited for, then the calling user terminating the call of this time, and carrying the information with the omitted sequence number in the UUS field of the call message of the next call.

The present invention further provides an equipment for implementing information exchange. This equipment may be a separate one, or may be a part included in a terminal; it comprises the following fundamental modules: an inserting module, a detecting module, a judging module and a processing module;
the inserting module is used to insert information to be sent into a UUS field of a call message that is sent to a called user terminal; generally, the inserting modules works when a terminal is used as a calling user terminal;
the detecting module is used to detect a type of the UUS field of the call message that is received, and if the type is sending information type, then instructing the processing module to terminate the call procedure and instructing the judging module to work;
the judging module is used to sort out the information carried in the UUS field of the call message that is received, judging whether the information is complete or not, and sending the judging result to the processing module;
the processing module comprises a called terminal processing sub-module and a calling terminal processing sub-module; the calling terminal processing sub-module works when the terminal is used as a calling user terminal; the called terminal processing sub-module works when the terminal is used as a called user terminal.

The called terminal processing sub-module is used to feed back a message containing a UUS field other than an acknowledge message to a calling user terminal after receiving the judging result, and carry the judging result in the UUS field of the message that is fed back;

the calling terminal processing sub-module is used to terminate this call after receiving the message fed back; if the judging result carried in the UUS field of the message fed back is "incompletely received", then the calling terminal processing sub-module instructs the inserting module to insert the corresponding information into the UUS field of the call message of the next call.

Optionally, the step of the inserting module inserting information to be sent into a UUS field of a call message that is sent to a called user terminal specifically comprises:

the inserting module editing or setting the information to be sent and its type;

when initiating a call, the inserting module carrying the information in a UUS field of one call message according to the size of the information, or splitting the message into a plurality pieces of information and carrying them in the UUS fields of a plurality of call messages respectively;

the inserting module recording in a UUS field of a call message carrying the information the type of the information, the total number of the pieces of information and the sequence number of the information carried in the UUS field;

Correspondingly, the judging module is also used to sort out the type of the information, the total number of the pieces of information and the sequence number of the information recorded in the UUS field from the received call message.

Optionally, the step of the judging module judging whether the information is complete or not may specifically comprise:

the judging module judging whether the information carried in the UUS field is a single piece of information or one of a plurality pieces of information according to the total number of pieces of information recorded in the UUS field;

the judging result being "complete" if the information is a single piece of information;

otherwise, comparing the sequence number with the total number;

the judging result being "completely received" if the sequence number is equal to the total number and there is no omission;

the judging result being "incompletely received" if the sequence number is equal to the total number but there is omission, and waiting for information with a sequence number that is omitted;

the judging result being "incompletely received" if the sequence number is less than the total number, and waiting for information with a next sequence number.

Optionally, the step of the calling terminal processing sub-module instructing the inserting module to insert the corresponding information into the UUS field of the call message of the next call when the judging result carried in the UUS field of the message fed back is "incompletely received" specifically comprises:

if the judging result carried in the UUS field of the message fed back is "incompletely received" and the information with a next sequence number is waited for, then the calling terminal processing sub-module instructs the inserting module to insert the information with the next sequence number into the UUS field of the call message of the next call;

if the judging result carried in the UUS field of the message fed back is "incompletely received" and the information with a next omitted sequence number is waited for, then the calling terminal processing sub-module instructs the inserting module to insert the information with the omitted sequence number into the UUS field of the call message of the next call.

Optionally, the equipment may also comprise a storage module;

The processing module is also used to, when the judging result is "completely received", prompt the called user whether to display the information if the information carried in the UUS field is a single piece of information; combine all of the received information of this type according to the type of the information recorded in the UUS field if the information carried in the UUS field is one of a plurality pieces of information, store the combined information in the storage module and prompt the called user whether to display the information.

The storage module is also used to store the information, type of the information, the total number of the information and the sequence number of the information carried in the UUS field of the received call message; to store the information carried in the UUS field of the call message transmitted by different calling user terminals and related data (type, the total number and sequence number) in different positions.

Other implementation details are as described in the method.

The present invention will be further described with reference to an application example of the present invention.

FIG. 1A is a logical flow chart of the method for implementing information exchange according to the application example, wherein the method for implementing information exchange comprises the following steps:

Step 101: editing or setting the information to be sent and its type on the calling user terminal;

Step 102: when initiating a call, recording the information to be sent, the total number of pieces of the information, the sequence number of the current information (i.e., the information carried in the UUS field) and type of the information in the UUS field of the call message according to the size of the information;

Step 103: the called user terminal sorting out the information, the total number of pieces of the information, the sequence number of the current information and type of the information recorded in the UUS field from the call message after receiving the call message and storing them;

Step 104: judging the recorded information and its type in terms of completeness (i.e., the aforesaid "judging whether the information is complete");

Step 105: the called user terminal performing corresponding processing according to the judging result for completeness, and sending the judging result for completeness to the calling user terminal through the UUS field of a release message;

Step 106: the calling user terminal performing corresponding processing according to the judging result for completeness in the UUS field of the received release message.

Wherein, there are various combinations of modes for coding the information, the total number of pieces of information, the sequence number of the current information, type of the information and the judging result for completeness recorded in the UUS field, provided that the calling party and the called party use the same coding mode. One of them is provided here.

Figure 1B:
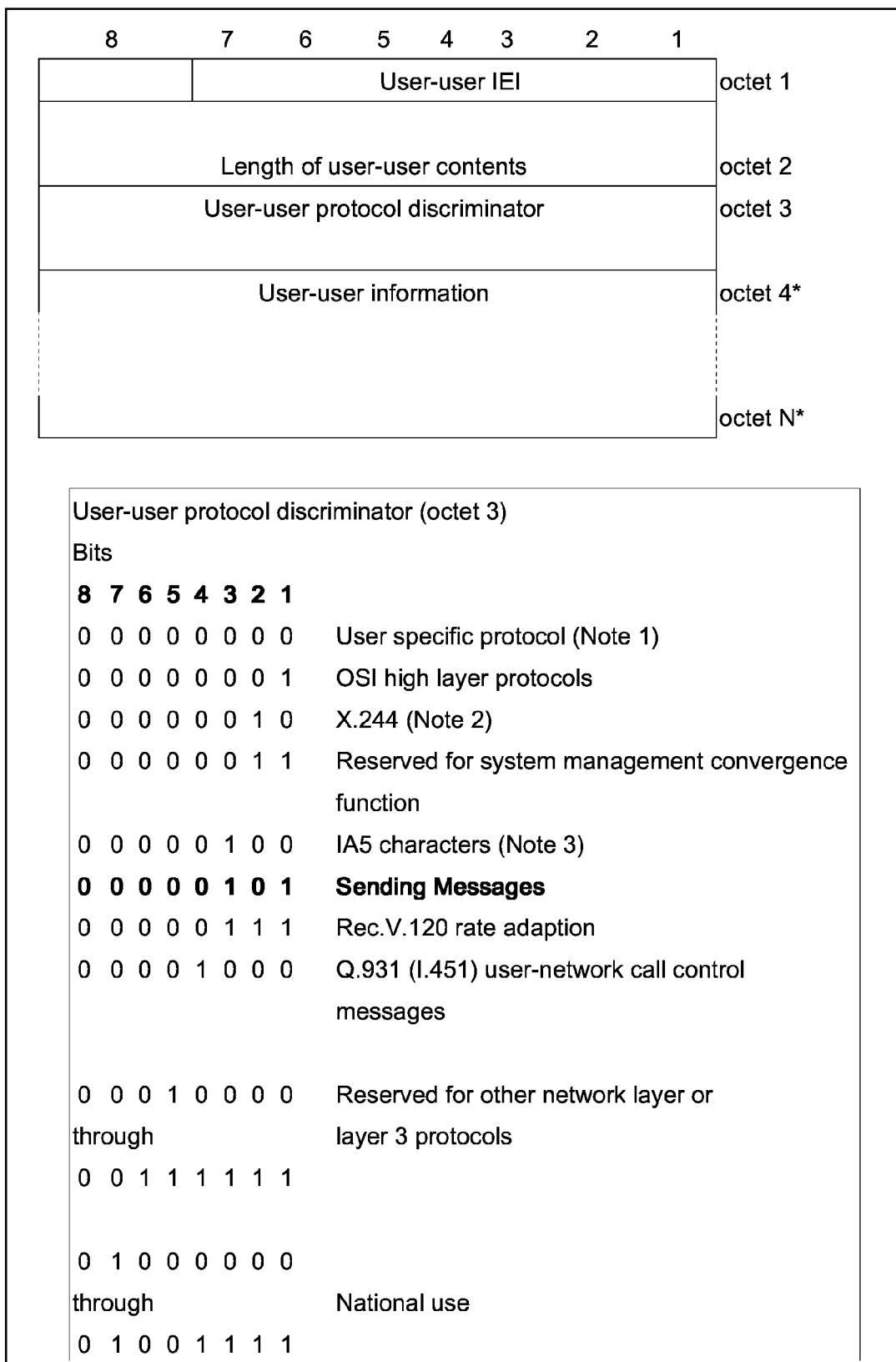
FIGS. 1B and 1C illustrate the coding mode of a UUS field used in the application example of the present invention.

FIG. 1B illustrates the coding mode of a UUS field used in this application example, and this figure shows the coding format of a user-user field defined by 3 GPP TS 24.008 V5.16.0 (2006-06). An unused octet may be optionally selected from Octet 3 as a protocol discriminating language for transmitting user alias, for example, 0×5 is used as a protocol discriminating language for Sending Messages. Pursuant to the provisions of 3 GPP TS 24.008 V5.16.0 (2006-06), the length of a user-user field is in a range from 35 to 131 octets, and with deduction of the former three indispensable octets, user information may be transmitted in the field of 28 to 128 octets within the range of user-user information. These 28 to 128 octets can be coded in a mode agreed by the calling party and the called party for transmitting user information.

Figure 1C:
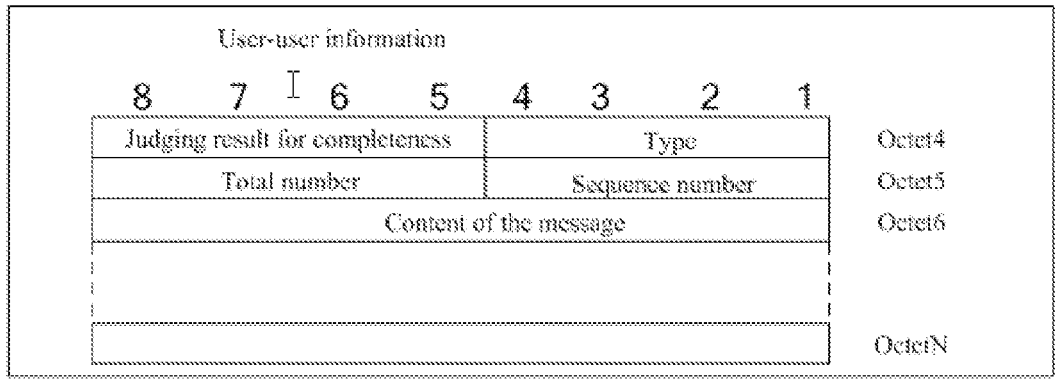

FIG. 1C illustrates a coding mode for user information provided in this application example Wherein, type of the information is transmitted using tetrads for suggesting the classes of information types that can be transmitted; the judging result for completeness uses tetrads, with 0×1 and 0×2 for indicating sending successfully and sending unsuccessfully respectively; the sequence number uses tetrads for recording the sequence number of the information that is successfully sent or unsuccessfully sent; the total number is recorded as the total number of messages in packet transmission, and when the judging result for completeness is "completely received" and the total number record is consistent with the sequence number of the information that is successfully sent, it is indicated that all of the messages are successfully sent.

Figure 2:
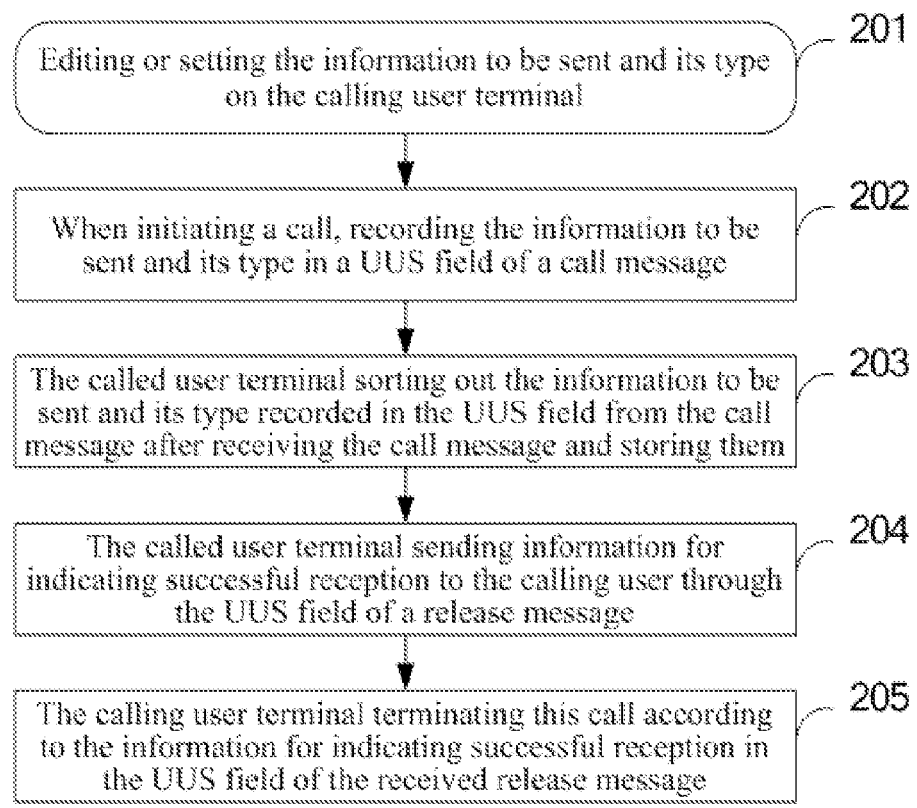
FIG. 2 is a logical flow chart of exchange of a single message according to the application example of the present invention.

FIG. 2 is a logical flow chart of exchange of a single message according to this application example, comprising the following steps:

Step 201: editing or setting the information to be sent and its type on the calling user terminal;

Step 202: when initiating a call, recording the information to be sent and its type in a UUS field of a call message;

Step 203: the called user terminal sorting out the information and its type recorded in the UUS field from the call message after receiving the call message and storing them;

Step 204: the called user terminal sending information for indicating successful reception (i.e., the judging result is "completely received") to the calling user through the UUS field of a release message;

Step 205: the calling user terminal terminating this call according to the information for indicating successful reception in the UUS field of the received release message.

Figure 3:
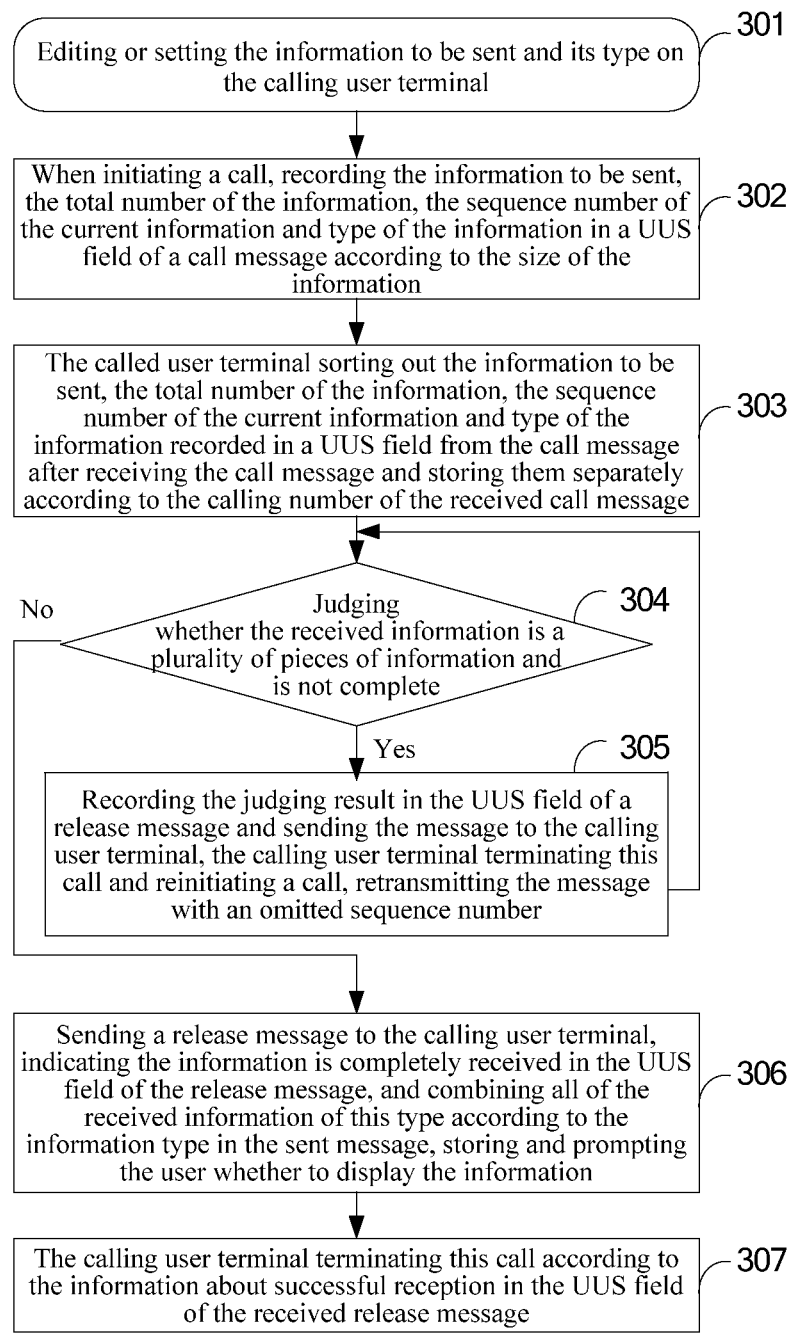
FIG. 3 is a logical flow chart of exchange of a plurality of message according to the application example of the present invention.

FIG. 3 is a logical flow chart of exchange of a plurality of messages according to this application example, comprising the following steps:

Step 301: editing or setting the information to be sent and its type on the calling user terminal;

Step 302: when initiating a call, recording the information to be sent, the total number of pieces of the information, the sequence number of the current information and type of the information in a UUS field of a call message according to the size of the information;

Step 303: the called user terminal sorting out the information, the total number of pieces of the information, the sequence number of the current information and type of the information recorded in the UUS field from the call message after receiving the call message and storing them separately according to the calling number of the received call message;

Step 304: judging whether the received information is a plurality pieces of information and is not complete, if yes, executing step 305, otherwise executing step 306;

Step 305: recording the judging result in the UUS field of a release message and sending the message to the calling user terminal, the calling user terminal terminating this call after receiving the message and reinitiating a call, retransmitting the message with an omitted sequence number, and executing step 304;

Step 306: sending a release message to the calling user terminal, indicating the information is completely received in the UUS field of the release message, and combining all of the received information of this type according to the information type in the sent message, storing and prompting the user whether to display the information;

Step 307: the calling user terminal terminating this call according to the information about successful reception in the UUS field of the received release message.

The message about successful reception in FIG. 2 and FIG. 3 is the judging result for completeness being "completely received".

Figure 4:
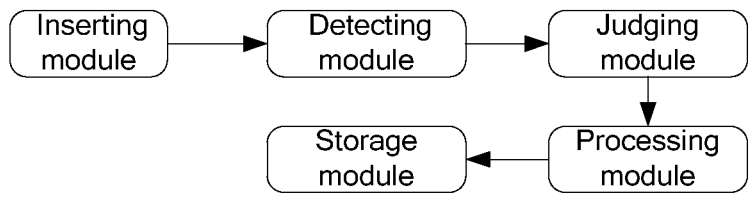
FIG. 4 illustrates the modules for composing the equipment for implementing information exchange according to the application example of the present invention.

FIG. 4 illustrates the modules for composing the equipment for implementing information exchange according to this application example.

As may be seen from this figure, the equipment is composed of the following fundamental modules: an inserting module for inserting the message to be sent, the number of the messages, the sequence number of the message and type of the message in the UUS; a detecting module for detecting whether type of the UUS field in the call message is sending messages type, if yes, then not executing a calling procedure but entering a message exchange procedure; a judging module for judging whether the received information is a single piece of information or a plurality of pieces of information, and whether a plurality of pieces of information are completely received; a processing module for performing corresponding processing according to the result provided by the judging module; a storage module for storing the received messages in different storage spaces according to different calling numbers.

Processing of the processing module based on the judging result of the judging module further comprises:

if the information is a single piece of information, which suggests that the information is successfully received, then recording the result in the UUS field of a release message and sending the message to the calling user terminal, the calling user terminal terminating this call upon receiving the message;

if the information is a plurality of pieces of information and is completely received, recording the result in the UUS field of a release message and sending the message to the calling user terminal, the calling user terminal terminating this call upon receiving the message;

if the information is a plurality of pieces of information but is not completely received, recording the result in the UUS field of a release message and sending the message to the calling user terminal, the calling user terminal terminating this call and reinitiating a call to retransmit the information with the omitted sequence number;

the module composition of this equipment can be widely applied to various terminal devices, such as mobile phone, desk phone and so on.

Of course, the present invention may have many other examples, and a person having ordinary skill in the art can make various corresponding modifications and transformations according to the present invention without departing from the sprit and essence of the present invention. These corresponding modifications and transformations, however, shall be within the protection scope defined by the claims of the present invention.

INDUSTRIAL APPLICABILITY

The simplicity and the easy transformation of the software update of user terminals are fully utilized in the present invention; therefore the technical solution disclosed in the present invention can enable a user terminal to have the information exchange function only by properly modifying the software of the user terminal. Wherein, the equipment for implementing information exchange can be applied to various types of telephone terminals, and both fixed telephone terminals and mobile telephone terminals can implement information exchange function conveniently. The telecommunication operators do not need to transform or update the switching equipment of the existing telephone network, and the information exchange between a calling user and a called user in a no-call situation can be achieved only by properly modifying (adding a software module of the corresponding service) the software of the user terminal.

What is claimed is:

1. A method for implementing information exchange comprising the following steps of:
    a calling user terminal sending information to be sent to a called user terminal by carrying the information in a user-to-user signaling (UUS) field of a call message;
    the called user terminal sorting out the information carried in the UUS field from the call message after receiving the call message, and feeding back a message other than an acknowledge message to the calling user terminal; and
    the calling user terminal terminating the present call procedure after receiving the message which has been fed back by the called user terminal, wherein,
    the calling user terminal sends the information to be sent to the called user terminal through one or more call messages;
    after sorting out the information carried in the UUS field, the called user terminal also judges whether the information is complete or incomplete; the message other than an acknowledge message is a message containing a UUS field, and the called user terminal carries a judging result in the UUS field in the message that is fed back;
    if the information is judged to be incomplete, then after receiving the message which has been fed back by the called user terminal, the calling user terminal continues to send a subsequent part of the information to be sent to the called user terminal through a UUS field of a subsequently sent call message.

2. The method according to claim 1 wherein the calling user terminal carries the information to be sent in a UUS field of a call message in the following way: editing the information to be sent on the calling user terminal;
    when initiating a call, the calling user terminal carrying the information in the UUS fields of one or more call messages according to a size of the edited information to be sent;
    the calling user terminal further recording in the UUS field of the call message carrying the information a total number of pieces of the information and a sequence number of the information carried in the UUS field.

3. The method according to claim 2 wherein the way for the called user terminal to judge whether the information is complete or incomplete comprises:
    the called user terminal judging whether the information carried in the UUS field is a single piece of information or one of a plurality pieces of information according to the total number of pieces of information recorded in the UUS field;
    the information is judged to be complete if the information is a single piece of information;
    otherwise, comparing the sequence number with the total number;
    the information is judged to be complete if the sequence number is equal to the total number and there is no omission;
    the information is judged to be incomplete and waiting for information with a sequence number that is omitted if the sequence number is equal to the total number but there is an omission;
    the information is judged to be incomplete and waiting for information with a next sequence number if the sequence number is less than the total number.

4. The method according to claim 3 wherein said continuing to send a subsequent part of the information to be sent to the called user terminal through a UUS field of a call message that is sent subsequently comprises:
    if the information is judged to be incomplete and information with a next sequence number is waited for, the calling user terminal carrying the information with a next sequence number in a UUS field of a call message in a next call;
    if the information is judged to be incomplete and information with an omitted sequence number is waited for, sending the information with an omitted sequence number in a UUS field of a call message of a next call.

5. An equipment for implementing information exchange comprising an inserting module, a detecting module, a judging module and a processing module, wherein;
    the inserting module is used to insert information to be sent into a user-to-user signaling (UUS) field of a call message that is sent to a called user terminal;
    the detecting module is used to detect a type of the UUS field of the call message that is received, and then instruct the judging module to work if the type is sending information type;
    the judging module is used to sort out the information carried in the UUS field of the call message that is received and instruct the processing module to work;
    the processing module comprises a called terminal processing sub-module and a calling terminal processing sub-module;
    the called terminal processing sub-module is used to feed back a message other than an acknowledge message to the calling user terminal;
    the calling terminal processing sub-module is used to terminate the present call procedure after receiving the message which has been fed back by the called user terminal;
    the inserting module inserts the information to be sent into one or more call messages;
    after sorting out the information carried in the UUS field, the judging module also judges whether the information is complete or incomplete, and sends a judging result to the processing module;
    the called terminal processing sub-module carries the judging result in the UUS field in the message that is fed back;
    when the judging module judges the information to be incomplete, the calling terminal processing sub-module instructs the inserting module to continue to insert a subsequent part of the information to be sent into a UUS field of a subsequently sent call message and send the message to the called user terminal.

6. The equipment according to claim 5 wherein the inserting module carries the information to be sent in a UUS field of a call message in the following way: the inserting module edits the information to be sent;

when initiating a call, the inserting module carries the information in the UUS fields of one or more call messages according to a size of the edited information to be sent;

the inserting module further records in the UUS field of the call message carrying the information a total number of pieces of information and a sequence number of the information carried in the UUS field.

7. The equipment according to claim 5 wherein the way for the judging module to judge whether the information is complete or incomplete specifically comprises:

the judging module judging whether the information carried in the UUS field is a single piece of information or one of a plurality pieces of information according to the total number of pieces of information recorded in the UUS field;

the information is judged to be complete if the information is a single piece of information;

otherwise, comparing the sequence number with the total number;

the information is judged to be complete if the sequence number is equal to the total number and there is no omission;

the information is judged to be incomplete if the sequence number is equal to the total number but there is omission, and waiting for information with a sequence number that is omitted;

the information being judged to be incomplete if the sequence number is less than the total number, and waiting for information with a next sequence number.

8. The equipment according to claim 6 wherein the calling terminal processing sub-module instructing the inserting module to continue to insert a subsequent part of the information to be sent into a UUS field of a call message that is sent subsequently and sending the message to the called user terminal comprises:

if the information is judged to be incomplete and information with a next sequence number is waited for, the calling terminal processing sub-module carrying the information with a next sequence number in a UUS field of a call message in a next call;

if the information is judged to be incomplete and information with an omitted sequence number is waited for, the calling terminal processing sub-module instructing the inserting module to send the information with an omitted sequence number in a UUS field of a call message of a next call.

* * * * *